United States Patent
Saidi et al.

[19]

[11] Patent Number: 5,846,673
[45] Date of Patent: Dec. 8, 1998

[54] ADDITIVE TO STABILIZE ELECTROCHEMICAL CELL

[75] Inventors: M. Yazid Saidi; Feng Gao; Jeremy Barker; Chariclea Scordilis-Kelley, all of Henderson, Nev.

[73] Assignee: Valence Technology, Inc., Henderson, Nev.

[21] Appl. No.: 762,079

[22] Filed: Dec. 9, 1996

[51] Int. Cl.[6] .................................................. H01M 10/40
[52] U.S. Cl. .......................... 429/195; 429/198; 429/224
[58] Field of Search .................................. 429/195, 198, 429/224

[56] References Cited

U.S. PATENT DOCUMENTS

| | | | |
|---|---|---|---|
| 4,279,972 | 7/1981 | Moses | 429/50 |
| 4,526,846 | 7/1985 | Kearney et al. | 429/194 |
| 4,662,065 | 5/1987 | Marincic et al. | 429/224 X |
| 4,880,714 | 11/1989 | Bowden | 429/198 X |
| 5,085,954 | 2/1992 | Kita et al. | 429/198 X |
| 5,296,319 | 3/1994 | Bito et al. | 429/194 |
| 5,316,876 | 5/1994 | Kuriyama et al. | 429/197 |
| 5,399,447 | 3/1995 | Chaloner-Gill et al. | 429/191 |
| 5,419,985 | 5/1995 | Koksbang | 429/212 |
| 5,427,875 | 6/1995 | Yamamoto et al. | 429/223 |
| 5,435,054 | 7/1995 | Tonder et al. | 29/623.5 |
| 5,463,179 | 10/1995 | Chaloner-Gill et al. | 429/192 |
| 5,474,858 | 12/1995 | Merritt | 429/57 |
| 5,482,795 | 1/1996 | Chaloner-Gill | 429/12 |

FOREIGN PATENT DOCUMENTS

| | | |
|---|---|---|
| 0 390 145 A | 10/1990 | European Pat. Off. . |
| 0 614 239 A | 9/1994 | European Pat. Off. . |
| WO 96/29750 | 9/1996 | European Pat. Off. . |
| 0 785 586 A | 7/1997 | European Pat. Off. . |
| 59 081 870 | 5/1984 | Japan . |
| 61 208 758 | 9/1986 | Japan . |
| 01 286 262 | 11/1989 | Japan . |
| 06 333 598 | 12/1994 | Japan . |

OTHER PUBLICATIONS

G. Herlen, B. Fahys, M. Székely, E. Sutter, C. Mathieu, M. Herlem, and J.F. Penneau, n–Butylamine as Solvent for Lithium Salt Electrolytes, Structure and Properties of Concentrated Solutions, Electrochimica Acta, vol. 41, No. 17, 2753–2760, 1996 (Month unknown).

Gofer, et al., "Solutions of $LiAsF_6$ in 1,3—Dioxolane for Secondary Lithium Batteries"; Journal of Power Sources, vol. 39, No. 2, 1 Jul. 1992, 163–178.

*Primary Examiner*—Stephen Kalafut
*Attorney, Agent, or Firm*—Linda Deschere

[57] ABSTRACT

The present invention provides a novel composition and method for preventing decomposition of one or more electrochemical cell components comprising an electrode having an active material, and an electrolyte. The method of the invention, for the first time, effectively overcomes problems which arise between the interaction of cell components and contaminate water retained in a cell. Such contaminate water reacts with the electrolyte which comprises a salt of lithium in a solvent. Solubilizing of the salt in solution with attendant interaction between the salt and water causes formation of hydrogen-containing acids. The method of the invention effectively blocks decomposition of a lithium metal oxide cathode active material, and particularly lithium manganese oxide (LMO, nominally $LiMn_2O_4$). Such decomposition is prevented by including in the cell a basic compound which forms an electron donor species in the electrolyte solution; and by neutralizing at least a portion of the acid by reacting the donor species with the hydrogen-containing acids thereby preventing decomposition of the lithium manganese oxide by the acid. The preservation of the lithium manganese oxide prevents degradation of other cell components by other mechanism. The basic compound is desirably an organic base, preferably a butylamine.

29 Claims, 5 Drawing Sheets

ADDITIVE TO STABILIZE ELECTROCHEMICAL CELL

FIELD OF THE INVENTION

This invention relates to electrochemical cells and batteries, and more particularly, to such cells and batteries having lithium-based active material.

BACKGROUND OF THE INVENTION

Lithium batteries are prepared from one or more lithium electrochemical cells. Such cells have included an anode (negative electrode), a cathode (positive electrode), and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

The lithium metal anode has been replaced with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material.

In a battery or a cell utilizing a lithium-containing electrode it is important to eliminate as many impurities as possible which may affect cell performance. More particularly, the rechargeability of a lithium metal foil electrode is limited by side reactions between metallic lithium and impurities. When impurities react with lithium there is formed a solid surface layer on the lithium which increases the impedance of the anode (negative electrode). Non-metallic, carbon anodes are also subject to passivation through reaction with cell impurities.

Loss of performance due to impurities has lead to the selection of solvents and salts which are less reactive with cell components. Yet, this avoids use of some solvents and salts which would have better performance in a cell as compared to their less reactive counterparts. In another approach, as exemplified in U.S. Pat. No. 5,419,985, acidic descants, and/or hydrolyzable compounds are added to precursor components of the cell. These compounds are used to take up water or hydrolyze with water and then the hydrolysis products are removed before the cell components are assembled. However, since the source of impurities which causes adverse reaction may be from any component within the cell, including negative electrode, positive electrode, and electrolyte, it is very difficult to completely eliminate the impurities prior to assembly of the completed cell. Therefore, such descants and hydrolyzable compounds are not sufficiently effective. This is particularly evident since after assembly of the cell, moisture and other impurities from the environment may penetrate through the cell's protective covering. Therefore, what is needed is an understanding of the mechanisms by which impurities cause undesirable loss of performance and reduce life cycle of battery due to undesirable interaction with impurities. Although interaction with metallic lithium has now been resolved by eliminating the use of the metallic lithium, yet there still remains the challenge of determining how impurities cause detrimental loss of capacity and an effective means for preventing loss of cell performance as a result of such interaction.

SUMMARY OF THE INVENTION

The present invention provides a novel composition and method for preventing decomposition of one or more electrochemical cell components comprising an electrode having an active material, and an electrolyte. The method of the invention, for the first time, effectively overcomes problems which arise between the interaction of cell components and contaminate water retained in a cell. Such contaminate water reacts with the electrolyte which comprises a salt of lithium in a solvent. Solubilizing of the salt in solution with attendant interaction between the salt and water causes formation of hydrogen-containing acids. The method of the invention effectively blocks decomposition of a lithium metal oxide cathode active material, and particularly lithium manganese oxide (LMO, nominally $LiMn_2O_4$). Such decomposition is prevented by including in the cell a basic compound which forms an electron donor species in the electrolyte solution; and by neutralizing at least a portion of the acid by reacting the donor species with the hydrogen-containing acids thereby preventing decomposition of the lithium manganese oxide by the acid. The preservation of the lithium manganese oxide prevents degradation of other cell components by other mechanism. It has been documented, for the first time, that subsequent additional related reactions occur to the same extent as the decomposition of the LMO, suggesting that the LMO break down provides a catalytic effect which causes one or more of the following: generation of water which in turn is capable of being reduced to hydrogen ($H_2$) gas at the anode; generation of additional hydrogen-containing gas (HY, HF); and generation of additional decomposition products from components in the cell such as the electrolyte solvent, forming any of a variety of gases such as carbon monoxide, carbon dioxide, and methane, which may further decompose to form $H_2$. The evolution of hydrogen gas by reduction at the anode significantly increases to volumetric size of the battery. In one embodiment, the basic compound of the invention may form electron donor species by dissociation in solution when the basic compound is represented by MX where M represents a metal and X represents the electron donor species. In another mechanism, the basic compound additive is an organic compound which provides electron donor species, such as in the case of an $NH_2$ group which is capable of forming an $N_3$ thereby interfering with formation of the acid component, with the result that acid attack of cell elements is prevented. The electrochemical cell of the invention is stabilized against decomposition occurring as a result of retained contaminate water. The cell of the invention comprises the electrolyte, the lithium salt, and a solvent which solubilizes the salt. The cell further contains hydrogen acids formed by reaction between the solubilized salt and the contaminate water. In the case of the cell which comprises lithium manganese oxide (LMO) active material, a basic lithium-containing compound is included which very effectively forms electron donor species in ion transfer relationship with acid, preferably adjacent particles of the active material. Such species react with the acid to neutralize at least a portion of the acid present in the electrode. The basic compound may be added directly to the cathode active material, in which case the basic compound additive may be in liquid form or in solid form, so long as it is in ion transport relationship with the cathode active material. In another embodiment, the additive may be added to the electrolyte solution. Preferably, such additive is miscible with the solution or soluble in the solution whereby the electrolyte solvent provides ion transfer relationship with electrode active material for transport of the electron donor species to prevent acid attack at the electrode.

Preferred basic compound additives are selected from the group consisting of carbonates, metal oxides, hydroxides, amines, organic bases, aluminates, and silicates. Most preferred are lithium-based compounds, such as lithium carbonates, lithium metal oxide, lithium mixed metal oxides, lithium hydroxides, lithium aluminates, and lithium silicates. Organic bases, particularly those having up to 6 carbon atoms are desirable, such as alkyls and phenols, butylamines are preferred.

Objects, features, and advantages of the invention include an improved electrochemical cell or battery based on lithium which has improved charging and discharging characteristics; a large discharge capacity; and which maintains its integrity over a prolonged life cycle as compared to presently used cells. Another object is to provide stabilized electrochemical cells which are stabilized against decomposition of cell components, including electrode and electrolyte components.

These and other objects, features, and advantages will become apparent from the following description of the preferred embodiments, claims, and accompanying drawings.

Detailed Description of the Preferred Embodiments

Figure 1:
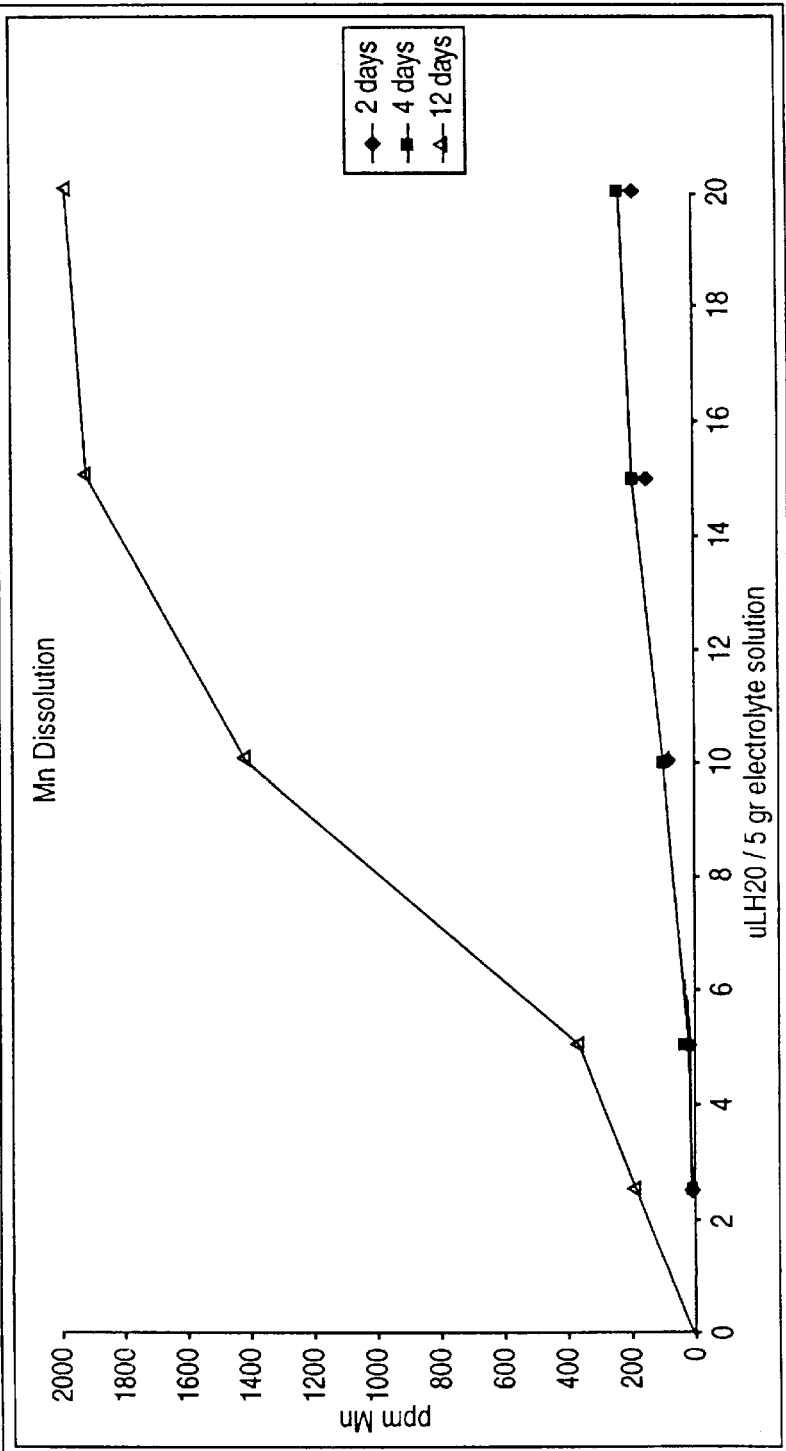
FIG. 1 is a graph showing the results of experiments where a given amount of lithium manganese oxide is added to a given amount of electrolyte. For the various samples, the amount of added water is varied. The various samples were monitored over a prolonged period of time, up to 12 days. The samples show the "time effect" and also the effect of increased amounts of water on the degradation of lithium manganese oxide as evidenced by the appearance of $Mn^{+2}$ ions in the solution.

The invention provides, for the first time, an understanding of the mechanisms by which electrochemical cell components are decomposed and provides, for the first time, an effective method for preventing such decomposition as well as compositions for inhibiting decomposition and stabilizing electrochemical cells. Before describing the invention, it is useful to understand the approaches taken in the past and to contrast such approaches with the more effective means provided here.

Undesired reactions between impurities in electrochemical cells and cell components have essentially focused on reactivity at the anode. For example, Koksbang U.S. Pat. No. 5,419,985 examines the effect of impurities on lithium metal anode which increases the impedance of the anode when water reacts with lithium to form a solid surface layer of dendritic lithium powder. The lithium powder isolates the metallic lithium anode both physically and electrically from the main body of the metallic anode. A lithium ion battery which uses graphite or carbon as a negative electrode is also subject to passivation at the carbon electrode by undesired reactions caused by the presence of impurities, especially water.

It is practically impossible to completely dry any component in the battery. First, because this will be impractical and second, because longer drying times as well handling of materials in totally water free environments is essentially impossible. Secondly, sometimes, water is not simply superficially included in the cell component, but rather it is relatively tightly entrained or bound to the cathode active material, essentially being tightly retained by the cathode active material, for example, lithium manganese oxide. Removing it requires elevated drying temperatures, high enough to decompose elements of the battery or even the active material itself.

In the past, it was thought that impurities in electrochemical cells resulted in a limited number of undesirable reactions. It was thought that once a significant portion of the impurities were removed, the undesirable reactions would cease to occur. However, for the first time, it has now been discovered that even a very small quantity of impurities in the parts per million magnitude cause reactions to occur which are sustained by the cell components themselves. It is now recognized that an avalanche reaction mechanism is initiated by a very small proportion of impurity where such avalanche reaction is sustained by consuming essential components of the cell, including electrode active material and elcetrolyte components. This replenishes the supply of impurities in a repeating sequence of reactions heretofore not known. Therefore, for the first time, it has been discovered that attempts to reduce impurities down to a very small level, as in the prior art, are ineffective to solve the problem of cell degradation, because the degradation is perpetuated by essential components of the cell which produce a fresh supply of impurities as the components decompose. More particularly, this involves decomposition of the active material, and particularly lithium manganese oxide ($Li_xMn_2O_4$, LMO), which is hygroscopic. Obviously, the active material cannot be eliminated from the cell. Therefore, an effective mechanism is required to prevent the avalanche reaction which occurs unabated regardless of how dry the initial cell is.

In contrast to earlier approaches, the present investigation has now determined that capacity loss occurs for reasons heretofore unexpected. By a series of experiments, the present investigation has documented that significant degradation of cathode active material occurs. The onset of such degradation is initiated by the presence of impurities. However, it has now been documented that the degradation rate increases due to generation of water within the cell. Surprisingly, water is formed as a by-product of the degradation reaction itself. For the first time, it has been determined that an auto-catalytic reaction within the cell itself generates water in a heretofore unexpected series of reactions. By a set of experiments, the present investigation was able to document that a very small amount of water in the PPM magnitude reacts with electrolyte salt in the electrolyte solution causing acid generation, and subsequent acid oxidation (acid attack), of the cathode material, and, more particularly, lithium metal oxide cathode material. The acid decomposition of a lithium manganese oxide cathode material produces water. In summary, the electrolyte salt and water produce an acid, the acid attacks the lithium manganese oxide, and the decomposition products include water. The freshly produced water then reacts with further lithium electrolyte salt to increase the acidic environment, generate more acid, which in turn further corrodes the lithium manganese oxide. It can be seen that in this avalanche reaction there is a cumulative corrosion of the lithium manganese oxide active material, because water reacts with the salt to produce acid which attacks the active material replenishing the supply of water, which in turn reacts with the electrolyte salt to generate additional acid. Theoretically, the reaction is capable of continuing until one of the reagents, the cathode active material or the electrolyte salt, is essentially all consumed. Therefore, the extent of decomposition is not related to the quantity of water impurity, rather the decomposition is "unlimited" as long as fresh reactants are generated from the active material. Cycling the cell will affect the reaction rates because during cycling, the state of charge or discharge of the battery is an average of 50 percent. The worst case is when the cell is fully charged. Therefore, the problem occurs during storage at essentially, full charge, and also during subsequent cyclic operation.

The electrolyte salt refers to any salt, for example, an inorganic salt which is suitable for use for ion transfer in a lithium cell. See for example U.S. Pat. No. 5,399,447, incorporated herein by reference in its entirety. Examples are $LiClO_4$, LiI, LISCN, $LiBF_4$, $LiAsF_6$, $LiCF_3SO_3$, $LiPF_6$, NaI, NaSCN, KI, CsSCN, and the like. In a lithium cell, the inorganic ion salt preferably contains a lithium cation and one of the various aforesaid anions. The problem of decomposition is very much evident with $LiPF_6$ since it decomposes readily. $LiAsF_6$ and $LiBf_4$ pose problems similar to $LiPF_6$ and all produce HF. There is relatively little to no problem with $LiClO_4$ and $LiCF_3SO_3$ with regard to interaction with water.

The acid corrosion of the lithium manganese oxide active material is evidenced by the appearance of manganese +2 ions which are soluble in the electrolyte. The $Mn^{+2}$ ions are reduced from the $Mn^{+3}$ or $Mn^{+4}$ state in the original $LiMn_2O_4$ active material. The acid corrosion also causes conversion of spinel lithium manganese oxide active material to open structure spinel $\lambda$-$MnO_2$ (lambda manganese dioxide). The LMO is a spinel belonging to the cubic crystallographic system. The lithium as well as the Mn and oxygen atoms all have assigned sites. On removal of lithium (or when the latter is etched from the LMO), the structure is unchanged because the lithium will vacate their (8a) sites without resulting in an increase in energy of the system (which will make the system unstable). The only change incurred during this process is a contraction of the unit cell, that is, a reduction in volume of the basic unit of the whole structure. Electrostatically, removal of a lithium ion (positively charged), with its electron being delocalized in this case, this will alleviate the Li—Mn bond because they are face sharing sites. However, the primary reason there is no major change in the spinel structure is a simple one. The removal of lithium results in oxidation of $Mn^3+$ to $Mn^4+$. The latter is a smaller ion. This outweighs the steric effect of the partial occupation of the tetrahedral 8(a) sites by the lithium ions. Obviously, this is detrimental to the life of the battery since any manganese corrosion means loss of capacity. A series of experiments confirmed the amount of lithium manganese oxide dissolved when in contact with the electrolyte. The conditions included adding controlled amounts of water to the electrolyte solution and then adding a basic compound to the electrolyte solution which essentially buffered the solution and interfered with the acid attack of lithium manganese oxide, the production of additional water, and additional acids as described hereinabove. In the tests, solutions were prepared each containing equal amounts of the lithium manganese oxide. As shown in Table I, experiment A, the beaker contained EC/DMC (ethylene carbonate/dimethyl carbonate) solvent with 1 molar $LiPF_6$ plus 5 microliters of added water. The conditions of case B were the same as A except twice as much added water was used. In case C, the solvent EC/DMC was used without the salt, and the solution was made acidic by the inclusion of 10 microliters of concentrated $H_3PO_4$ acid. Conditions of experiment D were the same as C except that concentrated HCl acid was used. In case E, the beaker contained the electrolyte (EC/DMC with 1 molar $LiPF_6$) plus a basic lithium-containing compound ($Li_2CO_3$). In experiment F, the beaker contained EC/DMC solvent and water.

As can be seen from Table I, after one day, the electrolyte in the presence of water dissolved and decomposed the lithium manganese oxide by acidic corrosive attack causing formation of 0.23 parts per million of reduced manganese ions dissolved in the solution. In case B, when the amount of water present was doubled, the amount of dissolved manganese doubled. In case C, when the vigorous acid, $H_3PO_4$ was included, in place of the added water and electrolyte salt, a significantly larger amount of dissolved manganese was found. The same was true in case D when hydrochloric acid was used. Of surprising interest is case E where the buffer $Li_2CO_3$ was included in the beaker, it effectively prevented acid attack of the lithium manganese oxide by the electrolyte. Recall that in case E, no added water was included, yet the LMO contained bound water as an impurity. In case F, the electrolyte salt was not present and the lithium manganese oxide was in the beaker in the presence of water and the solvent alone; essentially no dissolution of manganese was observed. By these experiments, it was possible to determine that loss of the cell capacity is related to dissolution of the cathode active material as evidenced by the presence of the decomposition product (manganese ion) dissolved in solution. It was surprising to find that when equivalent experiments were conducted with a different cathode active material, lithium cobalt oxide, there was very little oxidation of the lithium cobalt oxide. This surprising result demonstrates the susceptibility of lithium manganese oxide cathode active material to acid attack in an electrochemical cell. The results shown in the first column of Table I were based on observations made after the first day. The test beakers were left an additional three days and observations were again made. After four days, the progressively increasing production of acid in test beakers A and B results in 25 to 50 times greater amount of dissolved $Mn^{+2}$ ions. Interestingly, in case D where the salt ($LiPF_6$) was not included, the presence of the hydrogen chloride acid, alone, was not sufficient to cause corrosion to further propagate, and there was essentially no additional corrosion. Experiment E clearly shows the beneficial effect of adding a basic compound to prevent acid attack of lithium manganese oxide. Beaker F, like beaker D, shows that the lack of $LiPF_6$ salt means no further corrosion occurs. Importantly, there was essentially no change in the $Mn^{+2}$ ion concentration in beaker E, which contained a buffer to neutralize the acid. The lack of electrolyte salt in beaker F resulted in essentially no decomposition of the LMO, showing that the presence of water, alone, does not account for the decomposition.

Referring to Table II, columns 1 and 2 show the original reagents included in the beaker, in another test. ED is EC/DMC (2:1) while EDL is 2:1 EC/DMC with 1 molar $LiPF_6$. Columns 2 and 3 show the amount of LMO and protons calculated directly from the weight of LMO and acid added. Clearly, there is excess acid, so the manganese dissolution is expected to go to completion given sufficient time (3 weeks). The last column presents the amount of $Mn^{2+}$ measured for each experiment. The last experiment, where HF was produced, had the highest amount of manganese corrosion, and the amount in Column 3, 2.00 mmol $H^+$ was derived assuming 2 mol HF from 1 mol $H_2O$.

The graph in FIG. 1 contains the results of simple experiments where a given amount of LMO is added to a given amount of electrolyte. There are six samples. The first one does not contain any added water, only residual water is present. The five other ones have controlled amounts of water added in them, namely, 2.5, 5, 10, 15, and 20 microliters of water. All samples were made under argon atmosphere, so as not to pick up any additional water from the atmosphere. For each of the samples shown in the plot of FIG. 1, the beaker contained only lithium manganese oxide, $Li_1 Mn_2O_4$, the electrolyte, 2:1 ratio by weight of EC/DMC dissolved therein 1 molar $LiPF_6$. What the graph shows is that there is an increase in the amount of $Mn^{+2}$ found in the solution with time, not a lot to start with, but as time goes by, the amount increases dramatically. Note the increased amounts of $Mn^{+2}$ with increased amounts of water added. The "time effect" has its origin in the difference in reaction rates that seems to be the cause for the change in slope with time. It is thought that both reactions, the $LiPF_6$/$H_2O$ interaction, and the Mn dissolution, have different reaction rates, but both occur at the same time. It is not known what causes the "avalanche" effect, but it is believed to be related to the change of the interface layer between the LMO particles and the electrolyte as more surface area is now more accessible to the electrolyte after the initial leaching has occurred, because of the break down of this protective layer.

From the aforesaid experimental evidence, it was determined that a significant, if not major, contributor to loss of cell capacity in lithium manganese oxide-containing cells is corrosive attack on the cathode active material. This is in contrast to conventional thinking which focused on decomposition of lithium or carbon battery anodes. Further, based on the aforesaid experiments, the reactions that are thought to be occurring are as shown in Equations 1 and 2.

$$LiPF_6 + H_2O \rightarrow 2HF + POF_3 + LiF \quad (1)$$

$$4H^+ + 2LiMn^{3+}Mn^{4+}O_4 \rightarrow 3\lambda MnO_2 + Mn^{2+} + 2Li^+ + 2H_2O \quad (2)$$

Equations 1 and 2 show the interaction of water with the acidic electrolyte salt as the main reason for decomposition of cell components. The interaction of, for example, $LiPF_6$ salt with water generates hydrogen fluoride (HF) which is normally in a gaseous state, but is soluble in the organic electrolyte used in the experiments, namely, EC/DMC. It is thought that the $POF_3$, is also soluble in the electrolyte and leads to the generation of fluorophosphoric acid. The reaction of Equation 2 is of significant consequence and is of extreme commercial importance. Since the lithium manganese oxide (here generally represented by the formula $LiMn_2O_4$) is susceptible to corrosion, the acids shown in the above equations etch away at the lithium manganese oxide producing a lithium deficient material, a lambda manganese oxide ($\lambda$-$MnO_2$), and at the same time replenishes the supply of water. The aforesaid reactions are referred to as "avalanche reactions" in that they are able to continue and propagate until essentially all of the lithium manganese oxide is converted to $\lambda$-$MnO_2$. This is evidenced by the manganese ion ($Mn^{2+}$) found solubilized in the electrolyte. This acid attack corrosion of the lithium manganese oxide active material is extremely detrimental to the life of a battery since it obviously results in less capacity. It appears that the state of charge of the battery will have some influence on the reaction. If the battery is stored fully charged, more manganese is corroded or dissolved away from the lithium manganese oxide. The greater the state of charge, the greater is the driving force (rate) of reaction. It should be noted that LMO is represented by the nominal general formula $LiMn_2Mn_2O_4$, and by the more specific formula $Li_{1+x}Mn_{2-x}O_4$ with $-0.2 \leq x \leq 0.2$, in an initial, as prepared, condition. In a fully charged state, the LMO active material is not completely depleted of lithium. In the fully charged state, the nominal $LiMn_2O_4$ is found to roughly correspond to $Li_{0.2}Mn_2O_4$ with approximately 0.8 atomic units of lithium having been transferred to the graphitic anode when fully charged. Therefore, acid attack will deplete $Li^+$ ions along with $Mn^{+2}$ ions.

In summary, Tables I and II and FIG. 1 demonstrate that the two aforementioned reactions (1 and 2) are occurring. Each reaction has a rate which will dictate how fast/slow it will occur. The acidity of the electrolyte (solvent and solubilized salt) is there to begin with, but with the interaction of the water with the acidic electrolyte salt (the exemplary $LiPF_6$), more acid is produced, including the exemplary hydrogen fluoride (HF). The experiments confirmed that with time, more manganese ion is found in the electrolyte and confirms that the cathode material is being decomposed.

TABLE I

|   |   | PPM $Mn^{+2}$ | |
|---|---|---|---|
|   |   | Day 1 | Day 4 |
| A | Electrolyte + 5 μL $H_2O$ + LMO | 0.23 | 10.3 |
| B | Electrolyte + 10 μL $H_2O$ + LMO | 0.50 | 12.4 |

TABLE I-continued

|   | | PPM Mn$^{+2}$ | |
|---|---|---|---|
|   | | Day 1 | Day 4 |
| C | EC/DMC + 10 μL H$_3$PO$_4$ + LMO | 12.5 | — |
| D | EC/DMC + 10 μL HCl + LMO | 12.7 | 12.3 |
| E | Electrolyte + Li$_2$CO$_3$ + LMO | 0.09 | 1.08 |
| F | EC/DMC + H$_2$O + LMO | 0.04 | 0.02 |

TABLE II

Reaction of LiMn$_2$O$_4$ with Excess Acid in EC/DMC

| Additive | mmol LMO | mmol H$^+$ | ppm Mn$^{2+}$ |
|---|---|---|---|
| 0.14 gr HCl in ED | 0.27 | 1.37 | 505 |
| 0.13 gr HNO$_3$ in ED | 0.29 | 1.43 | 960 |
| 20 μl H$_2$O in EDL | 0.28 | 2.00 | 1662 |

Referring back to Equation 1, it can been seen that the exemplary electrolyte salt, LiPF$_6$, solubilizes to form an alkali ion, Li$^+$ ion, and a counter ion (anionic species) (PF$_6$—) which comprises a halogen, fluorinated by-product. The anionic species may further decompose producing the halogen atom in combination with other constituents, such as HF, POF$_3$, and LiF. Traces of water present anywhere in the cell components will eventually come into contact with these species and constituents, and according to reaction 2, will produce more acid. By using a basic compound added to the cell, it is possible to effectively prevent, minimize or neutralize the acid production (Equation 1) and decomposition of active material (Equation 2). This is exemplified by the basic compounds in reaction Equations 3A and 3B.

$$HF + Li_2CO_3 \rightarrow HLiCO_3 + LiF \quad (3A)$$

$$HF + LiAlO_2 \rightarrow HAlO_2 + LiF \quad (3B)$$

According to Equations 3A and 3B, the additive basic compound (exemplary Li$_2$CO$_3$ and LiAlO$_2$), when in the presence of the acid (HF), will tie up the fluorine anion (halogen anion) as LiF. LiF is an insoluble salt. At the same time, the carbonate anion (LiCO$_3^{-1}$ and AlO$_2^-$) is a proton acceptor (electron donor) which will combine with the hydrogen from the (HF) acid to form HLiCO$_3$ and HAl$_2$. More generally speaking, the hydrogen-containing acid is formed by reaction between water, and the electrolyte salt which dissociates to form anionic species which contains a halogen. The basic compound is preferably a metal-containing base represented by MX where X represents an electron donor species which reacts with said hydrogen-containing acid to form HX. The metal (M) of said MX compound reacts with the halogen-containing species to form a metal-halogen compound which is typically relatively insoluble in the electrolyte solvent. With reference again to Equations 1 and 2, the invention comprises minimizing further acid formation by buffering the acidity of the electrolyte so that the acid (HY), or any other acid produced as shown in Equations 1 and 2, is minimized. It is preferred that the basic compound be a basic carbonate, basic metal oxide, basic hydroxide, basic amine, or an organic base. It is desirable that the basic compound is a lithium-containing carbonate, a lithium metal oxide, a lithium mixed metal oxide, lithium hydroxide, or lithium metal oxide. Examples of additives which may be selected are LiOH, Li$_2$O, LiAlO$_2$, Li$_2$SiO$_3$, Li$_2$CO$_3$, CaCO$_3$, and organic bases such as organic alkyl bases, alkyl bases having not more than 6 carbon atoms per alkyl group, alkylamine bases, butylamines, desirably n-butylamine, and preferably tributylamine; and primary, secondary, and tertiary organic amines are also a part of the generic group. It is thought that the organic bases interfere with the reactions of Equations 1 and/or 2 by a somewhat different mechanism, yet the result, prevention of decomposition of the LMO is the same. An example based on the butylamines will now be described. It is known that HF acid is highly polar, exemplified by H$^+$F$^-$. This polar characteristic causes hydrogen bonding with the amine group of the butylamine. In the butylamine, NH$_2$, is capable of forming NH$_3$ with the F$^-$ ion highly attracted to the NH$_3$ group forming an amine salt. The butylamine thus will attract any hydrogen ion species within the solution and prevent attack of the LMO by the hydrogen ions.

There is another consequence of the earlier described decomposition of the metal oxide active material and continuous generation of water. This additional symptom relates to evolution of a considerable quantity of gaseous species concurrent with the manganese dissolution observed affecting the capacity of the cell. The subsequent additional related reactions occur to the same extent as the decomposition of the LMO, suggesting that the LMO break down provides a catalytic effect which causes one or more of the following: generation of water which in turn is capable of being reduced to hydrogen (H$_2$) gas at the anode; generation of additional hydrogen-containing gas (HY, HF); and generation of additional decomposition products from components in the cell such as the electrolyte solvent, forming any of a variety of gases such as carbon monoxide, carbon dioxide, and methane, which may further decompose to form H$_2$. In some solvents, containing C—O—C bonds, it is thought that cleavage occurs at one or both of the bonds in the C—O—C. The evolution of hydrogen gas by reduction at the anode significantly increases the volumetric size of the battery. Decomposition of the lithium manganese oxide provides opportunity for a number of mechanisms catalyzing additional reactions such as decomposition of the electrolyte solvent. The reduction of manganese Mn$^{+3}$ and/or Mn$^{+4}$ to Mn$^{+2}$ involves electron transfer mechanism. Where such electron transfer mechanism is possible, catalysis is also possible. It is thought that the decomposition of the lithium manganese oxide continuously exposes fresh lithium manganese oxide surface to compounds dissolved in the electrolyte solution which provides an effective catalyst for reaction decomposition and cleaving of atomic bonds. Such mechanism is observed for lithium manganese oxide, but, surprisingly, was not observed for other metal oxides such as lithium cobalt oxide. When comparative tests were conducted, it was observed that evolution of gas was very minor and essentially not a problem in the case of lithium cobalt oxide (LiCoO$_2$). In contrast, significant evolution of gas was observed in cells formed of lithium manganese oxide (LiMn$_2$O$_4$) due to the mechanisms described above. The surface of the lithium cobalt oxide active material from a cell was examined and it was observed that a passivated ionically conductive interface was present. This is thought to create a barrier against electron transfer and prevent interaction between the oxide and other components of the cell. Such stable, barrier passivation, was not observed with lithium manganese oxide cells.

Without being held to any particular theory, it is thought that the lithium manganese oxide dissolution causes the passivation layer to be discontinuous which allows for further break down of organic electrolyte solvent. Electrolyte decomposition will occur with any solvent at high enough potential. In the case of lithium cells, the solvents are organic, aprotic, polar solvents. The extent of decomposition of solvents will occur at different rates and different potentials. In the case of the exemplary carbonates discussed in the present invention, the solvent may be acyclic carbonate or linear carbonate, yet the same decomposition mechanism applies at different rates. Common organic solvents are γ-butyrolactone, tetrahydrofuran, propylene carbonate, vinylene carbonate, ethylene carbonate, dimethyl carbonate, diethyl carbonate, butylene carbonate, methyl-ethyl carbonate, dipropyl carbonate, dibutyl carbonate, diethoxy ethane, ethyl-methyl carbonate, dimethoxyethane, and dioxolane. An exemplary break down mechanism will now be described for organic solvents which are acyclic or cyclic compounds comprising a low alkyl group having 1 to 4 carbon atoms. Decomposition was observed in the case of the ethylene carbonate/dimethyl carbonate mixture. It appears that such break down occurs in a solvent when the alkyl group is connected through an oxygen to the main chain of the compound. In this case, the alkyl group is cleaved in the presence of the decomposed LMO, which is caused by the acid attack. Therefore, the reaction between the acid and the oxide causes decomposition of the electrolyte solvent. As stated earlier, the extent of decomposition reaction depends on the state of charge of the cell, and the reaction rate is greater at higher state of charge, that is, higher voltage. The rate of gassing is greater at higher state of charge, but the corrosion of the LMO occurs regardless of the state of charge. Yet, for the corrosion reaction, the greater the state of charge, the greater is the driving force for the corrosion reaction.

To further confirm the mechanism of lithium metal oxide break down in the presence of acid leading to break down of other cell components, additional experiments were conducted. Electrochemical cells were assembled and prepared having graphite-based anodes, an electrolyte which is 1 molar $LiPF_6$, and EC/DMC. In one case the cells had a cathode prepared with lithium cobalt oxide ($LiCoO_2$) active material and in the other case, the cell was prepared with lithium manganese oxide active material. Each cell had entrained water in the amount of about 350 parts per million equivalent to about 1.6 milligrams of water. Of this, approximately 20 PPM or 0.024 milligrams of water was included in the electrolyte. The two cells were prepared in the same manner. The content of the exemplary LMO cell will now be described, generic cells are described later, below, with reference to FIG. 2.

The anode was fabricated by solvent casting a slurry of graphite, binder, plasticizer, and solvent. The graphite used for the slurry may be either SFG-15 (Lonza G&T, Ltd; Sins, Switzerland) or BG-35 (Superior Graphite, Chicago, Ill.), Kynar Flex 2801™ (a 88:12 copolymer of polyvinylidene difluoride (PVDF) and hexafloropropylene (HFP) was used as the binder, a plasticizer and an electronic grade solvent were also used. The slurry was cast onto glass and a free standing electrode was formed as the solvent was evaporated. The anode slurry composition was as follows:

| Component | Wet Weight % | Dry Weight % |
|---|---|---|
| Graphite | 24.3 | 58.3 |
| Binder | 6.8 | 16.4 |
| Plasticizer | 10.5 | 25.3 |
| Solvent | 58.4 | — |
| Total | 100.0 | 100.0 |

The cathode was fabricated by solvent casting a slurry of LMO additive ($Li_2CO_3$), conductive carbon, binder, plasticizer, and solvent. The conductive carbon used was Super P (MMM Carbon), Kynar Flex 2801™ was used as the binder along with a plasticizer, and electronic grade acetone was used as the solvent. The slurry was cast onto aluminum foil coated with a polyacrylic acid/conductive carbon mixture. A cathode slurry was cast onto glass and a free standing electrode was formed as the solvent was evaporated. The cathode slurry composition was as follows:

| Component | Wet Weight % | Dry Weight % |
|---|---|---|
| $Li_2CO_3$ | 0.45 | 1.00 |
| $LiMn_2O_4$ | 28.81 | 64.41 |
| Graphite | 2.44 | 5.45 |
| Binder | 4.43 | 9.90 |
| Plasticizer | 8.61 | 19.24 |
| Solvent | 55.27 | — |
| Total | 100.0 | 100.0 |

The separator used to laminate the anode and cathode together and prevent them from electrically shorting together was formed by solvent casting a slurry of fumed silica oxide, binder, and plasticizer diluted with an appropriate solvent. The fumed silica (Cabo-Sil) acts as a filler to provide structure for the separator film. Kynar 2801 was used as the binder. The plasticizer is used to provide film porosity after extraction. Acetone was used as the solvent. The slurry was cast onto glass using a doctor blade to cast an approximately 2.3 mil thick film after solvent evaporation. The separator slurry composition was as follows:

| Component | Wet Weight % | Dry Weight % |
|---|---|---|
| Fumed $SiO_2$ | 6.0 | 22.3 |
| Binder | 8.9 | 33.3 |
| Plasticizer | 11.8 | 44.4 |
| Solvent | 73.3 | — |
| Total | 100.0 | 100.0 |

An electrochemical cell of the anode, separator, and cathode films was formed by first hot pressing two 48 $cm^2$ pieces of the respective electrode materials to an expanded metal mesh grid. The films were laminated at 120° C. and 50 psi. Copper grid was used for the anode laminate and aluminum grid was used for the cathode. After initial lamination, the electrodes and separator film were laminated together by hot pressing at 115° C. and 40 psi.

After lamination, the plasticizer was extracted to create cell porosity by washing three times in a methanol bath for 20 minutes for each bath. The cells were dried at 40° C. under vacuum overnight after extraction.

The electrolyte used for the cells was a 2:1 ratio of ethylene carbonate to dimethyl carbonate (EC/DMC) with 1 molar $LiPF_6$ as the conductive salt (Grant-Ferro Corp., Zachary La.). The basic compound may also be added to the electrolyte solution. Therefore, the basic compound may be included in any combination of anode, cathode, and electrolyte. A basic compound may also replace a part of the graphite, in a proportion similar to the cathode shown below. It is evident that the electron donor species will react to neutralize acid where ever in the cell such acid is found. Further, the transport properties and ion transfer properties of the solvent, at least to some extent, cause transport of basic compound and/or electron donor species throughout the cell for neutralizing the acid.

The two cells were left in storage for one week. After one week, the cell containing the lithium manganese oxide cathode active material was found to contain 2.5 PPM of $Mn^{+2}$ dissolved in the electrolyte. In contrast, the cell containing the lithium cobalt oxide active material did not contain any dissolved cobalt. This striking difference highlights the surprising susceptibility of $LiMn_2O_4$ to corrosion. It was also observed that essentially no gaseous decomposition products were evolved in the case of the lithium cobalt oxide cell, whereas the flexible storage case containing the lithium manganese oxide-based cell had expanded, puffed out like a balloon, demonstrating the presence of gaseous decomposition products.

Figure 3:
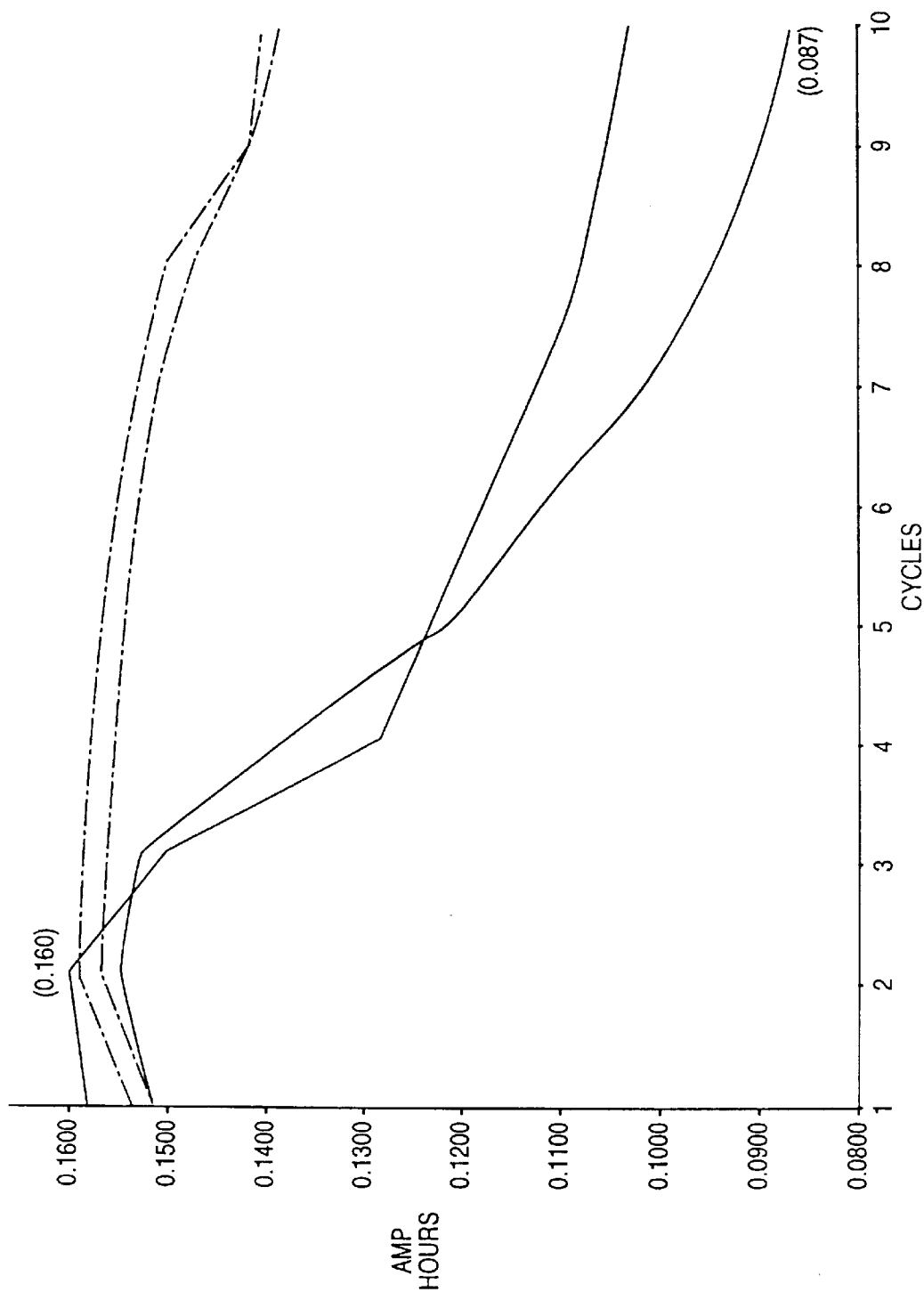
FIG. 3 is a graph of discharge capacity versus cycles at ±2 milliamps per square centimeter between about 2 and 0.01 volts for a cell having LMO cathode, graphite anode, 1 molar $LiPF_6$ in 2:1 by weight EC/DMC solvent. The top two sets of dashed lines are for a cathode mixture which includes basic additive $Li_2CO_3$. The bottom two sets of solid lines are for a conventional cathode mixture without any basic additive.
Figure 4:
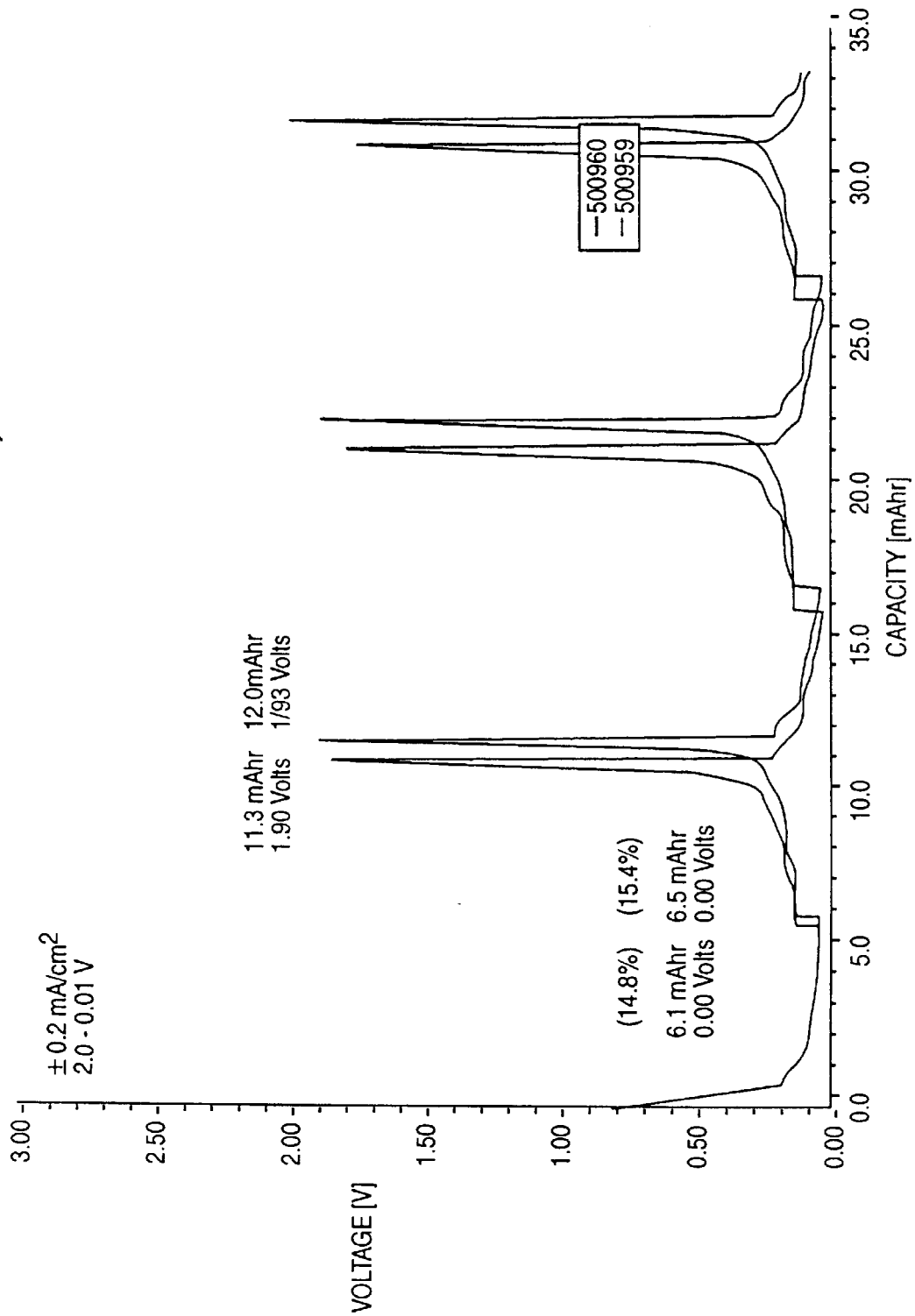
FIG. 4 is a voltage/capacity plot of a graphite electrode cycled with a lithium metal counter electrode using constant current cycling at ±0.2 milliamps per square centimeter, between 2.0 and 0.01 volts. The electrolyte is 1 molar $LiPF_6$ in 2:1 by weight EC/DMC solvent. The graphite is supplied under the name BG by Superior Graphite Corporation (USA). The electrolyte solution contains a basic compound, 10 percent tributylamine.
Figure 5:
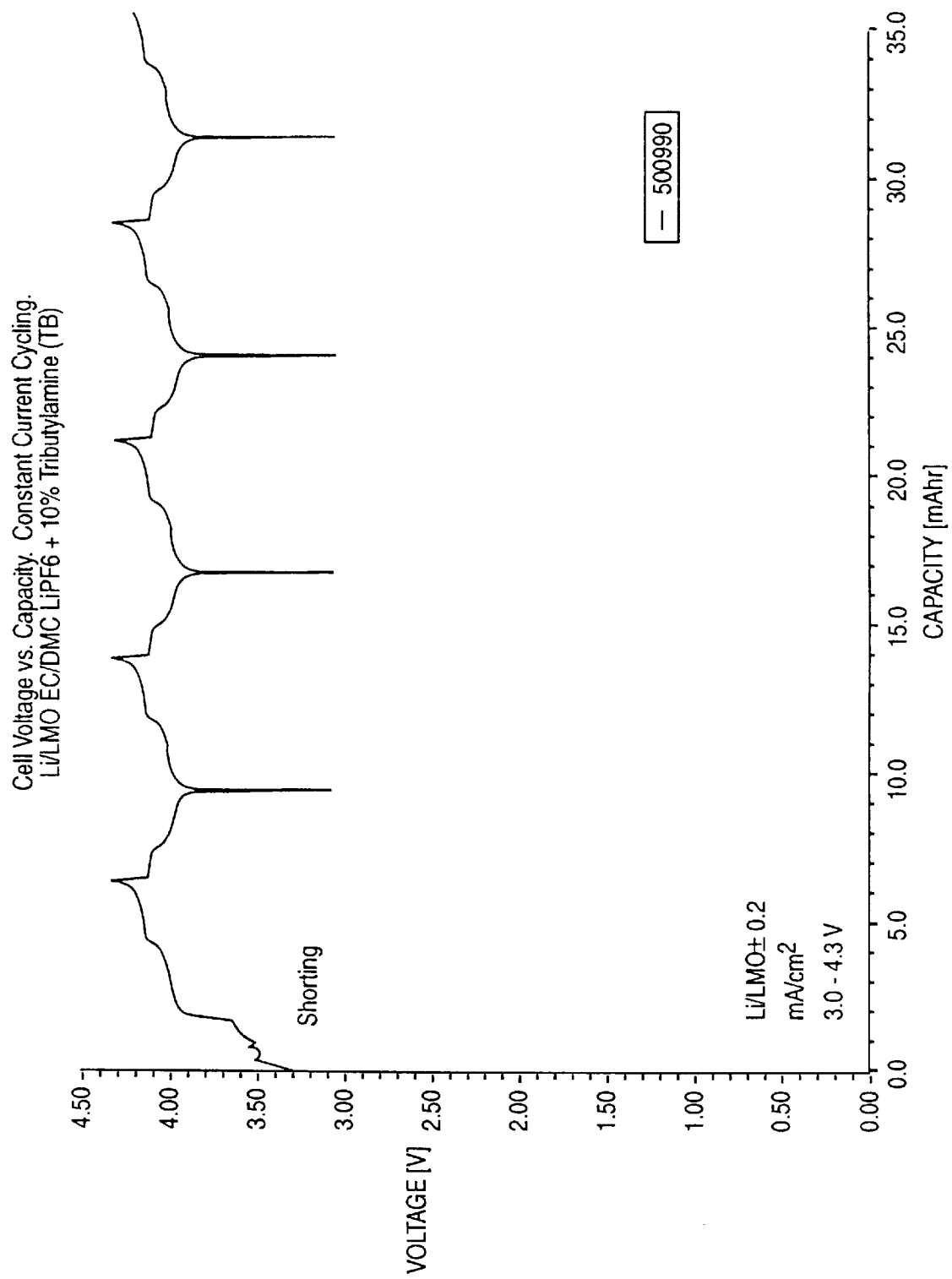
FIG. 5 is a voltage/capacity plot of lithium manganese oxide cycled with a lithium metal anode using constant current cycling at ±0.2 milliamps per square centimeter, between 3 and 4.3 volts. The electrolyte is 1 molar $LiPF_6$ in 2:1 by weight EC/DMC solvent. The basic compound added to the cell is 10 percent tributylamine.

Further proof of the efficacy of the basic compound used to protect lithium manganese oxide active material in an electrochemical cell can be seen by reference to FIGS. 3 through 5. Added cells were prepared as described immediately above, and cycled. The results are shown in FIG. 3. The data sets represented by the dashed lines are cells having the LMO and additive, and maintained high capacity for at least 10 cycles. The capacity loss was only about 15 percent. This performance is remarkable. Comparative cells were prepared as described immediately above, but without the additive. The results are shown in FIG. 3, data sets represented by the lower two solid lines. Capacity diminished from 0.160 to 0.087 amp hours within 10 cycles, a 45 percent decline.

FIG. 4 shows a voltage capacity plot using the 10 percent tributylamine basic compound additive in the cell comprising a graphite electrode and a lithium metal counter-electrode using 1 molar $LiPF_6$ and EC/DMC solvent. In the first half cycle the voltage drops to approximately 0.01 volts. In the second half cycle, the average voltage reaches approximately 2 volts versus $Li/Li^+$, with intercalation. The percentage difference between the capacity "in" and the capacity "out" on the first cycle corresponds to a surprisingly low capacity loss in the range of 14.8 to 15.4 percent. In the rest of FIG. 4, the first and second half cycles are repeated, showing the remarkable consistency and cyclability of this cell. FIG. 5 shows a voltage capacity plot of lithium manganese oxide cycled with a lithium metal electrode where the cell contains the basic compound 10 percent tributylamine in the electrolyte solution comprising $LiPF_6$ and EC/DMC. Constant current cycling is at ±0.2 milliamps per centimeter square, between 3 and 4.3 volts versus $Li/Li^+$. FIG. 5 demonstrates the excellent reversibility of this system. Cyclic performance is adequately maintained with the basic additive forming a part of the electrolyte solution. Therefore, the basic additive is able to function to prevent decomposition of cell components without demonstrating any incompatibility and without demonstrating any adverse effect on cell operation.

For maximum effectiveness in preventing decomposition of the cathode active material, the basic lithium compound is in direct or indirect ion transfer, ion transport, relationship with the acid in the cathode. This provides electron donor species in contact with or at least closely adjacent particles of the active material. Such species then reacts with acid to prevent acid from attacking the active material. It is preferred that the basic compound additive be dispersed throughout the cathode (positive electrode) of the cell. If the additive is not soluble in the solvent or is not miscible in the electrolyte solvent, it is preferably included in the cathode mixture. If the additive is soluble in the electrolyte or miscible with the electrolyte solvent, it is preferably added to the solvent. In one embodiment, the additive is a basic liquid miscible in the electrolyte solvent and migrates to and throughout the cathode. Even an immiscible basic liquid will be transported to some extent within the cell by the electrolyte solvent. A basic additive which is soluble in the electrolyte solvent migrates to and throughout the cell including the electrodes. In still another embodiment, the basic additive is an insoluble solid or immiscible liquid which forms a part of the electrode mixture, preferably added to the precursor cathode paste. In order to provide maximum protection to the cathode material, it is preferred that the basic compound be in intimate contact with the cathode active material. It is desirable that the basic additive be mixed with particles of the lithium manganese oxide active material in the precursor paste. It is preferred that the lithium manganese oxide material being in particle form is intermingled with a basic compound which is itself also in particle form. By this arrangement, the basic material is in intimate particle-to-particle, grain-to-grain contact, with the lithium manganese oxide active material it is meant to protect. If desired, the basic compound additive may be included in other components of the cell including the electrolyte and the anode (negative electrode).

Preferred additives effectively neutralize the undesirable acidic effects without affecting the electrochemical performance of the cell, because the metal ion of the additive is the same ion, namely, lithium, which is the ionic species which engages in the electrochemical function of a cell. These additives, therefore, effectively and efficiently block the recurring reactions which lead to acid formation, lithium manganese oxide degradation, and consequential gas generation. The method and compositions of the invention can be easily used commercially to form electrochemical cells having improved electrochemical stability and capacity.

Various methods for fabricating electrochemical cells and batteries and for forming electrode components are further described immediately below to illustrate use of the additive. The invention is not, however, limited by any particular fabrication method as the novelty lies in the unique compositions used in the cells to stabilize the cells. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

Figure 2:
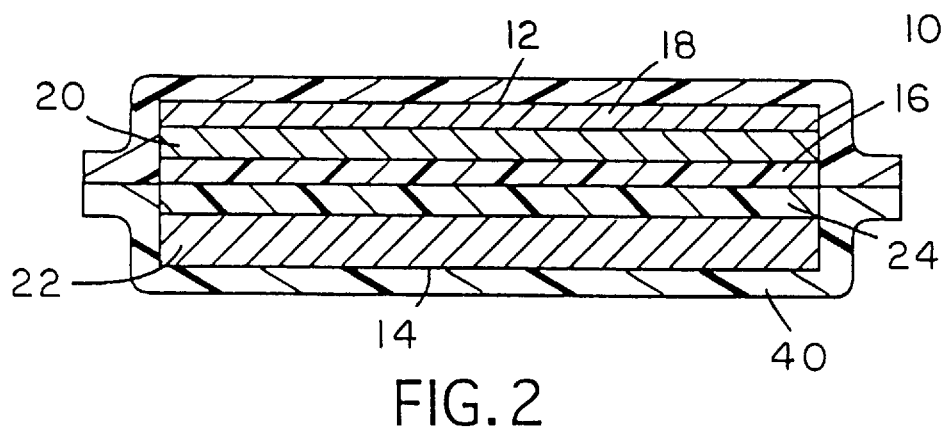
FIG. 2 is an illustration of a cross section of a thin battery or cell embodying the invention.

A description of the electrochemical cell or battery which uses the novel compositions and methods of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 2, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber.

Essentially, any lithium ion containing conducting electrolyte may be used. Essentially any method may be used to maintain the positive and negative electrodes spaced apart and electrically insulated from one another in the cell. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; 5,037,712; 5,463,179; 5,399,447; and 5,482,795. Each of the above patents is incorporated herein by reference in its entirety. Protective bagging material 40 covers the cell and prevents infiltration of air and moisture.

Electrodes having the lithium manganese oxide active material are generally made by mixing a binder, the metal oxide active material, and carbon powder (particles of carbon). Preferably, the content is as follows: 50 percent to 90 percent by weight active material; 5 percent to 30 percent carbon black as the electric conductive diluent; and 3 to 20 percent binder. The stated ranges are not critical. The active material may range from 25 to 85 weight percent. These electrode materials are mixed and blended together with a solvent. Then the mixture is coated onto a temporary substrate, such as glass, or onto a current collector to achieve a desired thickness for the final electrode. The preferred graphite-based electrode comprises about 60 to 95 percent by weight of the specific graphite particles, and more preferably about 90 percent by weight, with the balance constituted by a binder. Preferably, the graphitic electrode is prepared from a graphite slurry. The slurry is coated onto a glass substrate or onto a current collector by standard solvent casting techniques, such as by a doctor blade type coating. Preferably, the electrodes are dried to remove residual water prior to making the electrochemical cell. The preferred electrolyte used to form the completed final cell or battery comprised ethylene carbonate and dimethyl carbonate (EC/DMC) in a ratio of 2:1 by weight. The positive and negative electrodes are maintained in a separated condition using a fiber glass layer. The electrolyte salt has a concentration of 1 molar $LiPF_6$ providing a liquid electrolyte which interpenetrates the void spaces of the fiber glass layer.

Cathode compositions are prepared from a precursor paste by mixing a cathode active material such as lithium manganese oxide, a conductor such as carbon, and a binder which is preferably ionically conductive. Such cathode compositions are prepared in the form of precursor pastes with a casting solvent and coated onto a current collector. It is, therefore, possible to mix the lithium manganese oxide particles with particles of the basic compound additive and include them together as part of the precursor paste which is coated onto the current collector. The additive added to the paste may be in liquid form. In this case, as long as the liquid additive is less volatile than the casting solvent, the liquid additive will remain in the paste after removal of the casting solvent. Therefore, the liquid additive will remain in intimate contact with the lithium manganese oxide active material after the cathode is formed. Alternatively, if a liquid base such as liquid organic base is used, it may be added directly to the electrolyte solution after the cell has been assembled or at any stage of cell assembly. If a liquid additive or soluble additive is used, it would find its way to all components of the cell and migrate throughout all such components. A limited selection of organic bases is miscible in the electrolyte solution and maintains electrochemical stability. The additive in particle form may also be included as a part of the electrolyte. It is thought that a solid insoluble additive is most effective when it is included directly as part of the cathode composition. It is thought that the additive in particle form would be least effective when included with the electrolyte or merely in surface contact with the cathode as it will not be in intimate contact with the bulk of the cathode lithium manganese oxide. The particle basic compound may also be added in the anode to counteract formation of acid by any water present in the anode, however, this is most remote from the cathode and will be of less direct influence in protecting the cathode active material from degradation.

The amount of the basic compound additive should be sufficient to buffer the electrolyte solution. As mentioned earlier, the electrolyte solution is typically 1 molar $LiPF_6$, or an equivalent salt, in an organic solvent such as EC/DMC. This solution by itself will be somewhat acidic. The invention seeks to prevent additional acid formation and prevent increased acidity by reaction of the salt with water. Therefore, the amount of additive should be sufficient to buffer the solution and cause its acidity to be maintained near the level of the electrolyte solution itself and prevent increased acid concentration due to decomposition of the electrolyte salt and reaction with water. In that regard, the amount of additive should be in an amount by weight which is less than the amount by weight of said active material in the cathode. An amount of additive equal to about 1 percent by weight of the LMO should be sufficient, and is thought to be 3 times greater than that required for a cell containing an estimated 350 ppm retained water. The amount of additive should not be so great that it significantly changes the acidity of the 1 molar $LiPF_6$ EC/DMC solution causing it to be relatively basic. It is preferred that the basic additive be electrochemically stable and not cause any other side reactions or interactions that could effect the operation of the cell. Therefore, a lithium-based compound is preferred. The basic additive should be stable and able to sustain voltage in the range of about 3.5 to 4.5 volts at which a lithium manganese oxide cell operates. It is preferred that the compound be a lithium-containing carbonate, such as lithium metal oxide, lithium hydroxide, so that when it reacts in solution to cause neutralization it does not release heterogeneous ions, that is, ions other than lithium. Therefore, lithium salts are preferred. Mixed oxides and mixed metal oxides, such as $LiAlO_2$ and $Li_2SiO_3$, are desirable. As stated, it is preferred that the additive function as a buffer and not cause the electrolyte solution to become more basic. The acidity of the typical electrolyte described above ($LiPF_6$) is about a pH of 4. Therefore, if the basic compound additive has a pH in the range of 9 to 11, it should be sufficiently basic to act as a buffer. It is preferred that the pH of the basic compound additive not be above 12 or 13.

In summary, the present invention provides an effective means for interfering with the reaction mechanism of acid attack, corrosion of lithium manganese oxide active material. This oxidation degradation is surprisingly not a problem in the case of a comparative lithium cobalt oxide. It is thought that in the case of other lithium oxide materials, such as lithium cobalt oxide, the individual particles of such active material are passivated. The passivation layer is effectively formed around each lithium cobalt oxide particle, therefore, encapsulating each of the particles in a protective film. This prevents degradation of other cell components, and particularly degradation of the electrolyte. In contrast to the relative stability of lithium cobalt oxide active material, the lithium manganese oxide active material is subject to continuing, repetitive corrosive attack which does not permit the development of a stable passivation layer. Therefore, the lithium manganese oxide degradation occurs essentially unabated, and causes break down of other cell components, and particularly the electrolyte. For the first time, the invention has defined the mechanisms of such break down and has identified additives necessary to interfere with such break down and decomposition. The additive is included in the cell so that it is in direct contact or closely adjacent, in close indirect contact, with individual particles of the lithium manganese oxide. The additive is dispersed within cathode. Such contact can be achieved by an additive which is itself in particle form, and where the particles of the additive are in direct contact or nearly adjacent to the particles of the lithium manganese oxide. Such close, intimate contact between the basic additive and the lithium manganese oxide particles may also be achieved by an additive which is in liquid form and is able to migrate to the lithium manganese oxide particles. Such close interaction is also achieved by an additive which is soluble in the liquid electrolyte solution. Where the basic additive is soluble in the electrolyte, the ionic species of such solubility would be in intimate association, intimate relation with the individual particles of the lithium manganese oxide. Although, oxides, hydroxides, and carbonates, which are preferred for use in the invention, are known to be basic, not all oxides are suitable. For example, silicon oxide is acidic and would not be suitable. Other basic additives among the preferred class are less desirable if they are not electrochemically stable. Carbonates, aluminates, and silicates are particularly desired as they are weak bases. Lithium carbonates, lithium aluminates, and lithium silicates are particularly preferred because they contain a lithium species, and are shown by experimental evidence to be effective in stabilizing the cell.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

We claim:

1. A method for preventing decomposition of one or more electrochemical cell components comprising an electrode having an active material, and an electrolyte; said method comprising: providing an electrolyte which comprises a salt of lithium in a solvent, and solubilizing said salt in said solvent whereby hydrogen-containing acids are formed by interaction between said solubilized salt and contaminate water retained in said cell; including in said cell a basic organic compound which forms ionic electron donor species; and neutralizing at least a portion of said acid by reacting said donor species with said hydrogen-containing acids thereby preventing decomposition of said cell components by said acid; and wherein said including step is conducted by dispersing said basic compound in said electrode.

2. The method according to claim 1 wherein said electrode comprises a lithium manganese oxide active material.

3. The method according to claim 1 wherein said basic organic compound is selected from the group consisting of organic amines.

4. The method according to claim 3 wherein said basic organic compound is tributylamine.

5. The method according to claim 1 wherein said basic compound is in liquid form.

6. The method according to claim 1 wherein said solvent is selected to provide transport throughout said cell, said basic compound is liquid or soluble in said solvent, and wherein said including step is conducted by mixing said basic compound in said solvent and transporting said donor species to said electrode for reaction with said acid.

7. An electrochemical cell having retained contaminant water therein and which is stabilized against decomposition by said retained water, said electrochemical cell comprising: an electrolyte comprising a salt of lithium, and a solvent which solubilizes said salt; hydrogen-containing acids formed by reaction between said solubilized salt and said contaminant water; an electrode comprising a lithium manganese oxide active material; and a basic organic compound which forms electron donor species in ion transfer relationship with said hydrogen-containing acid to neutralize at least a portion of said acid in said electrode; and wherein said cathode active material is represented by the nominal general formula $LiMn_2O_4$.

8. The electrochemical cell according to claim 7 wherein said basic organic compound is selected from the group consisting of organic amines.

9. The electrochemical cell according to claim 7 wherein said basic organic compound is tributylamine.

10. The electrochemical cell according to claim 7 wherein said basic compound is a liquid, and said solvent is arranged to provide transport of said basic compound throughout said cell.

11. An electrochemical cell having retained water therein and which is stabilized against decomposition by said retained water, said electrochemical cell comprising:
   a. an electrolyte characterized by being reactive with water to form an acid;
   b. a cathode comprising a lithium-containing active material characterized by being decomposable by said acid, and wherein said cathode active material compound is represented by the nominal formula $LiMn_2O_4$; and
   c. a basic organic amine compound characterized by being reactive with said acid to neutralize at least a portion of said acid, inhibit said decomposition, and stabilize said active material, and which is present in an amount by weight less than said active material.

12. The electrochemical cell according to claim 11 wherein said basic organic compound is selected from the group consisting of butylamines.

13. The electrochemical cell according to claim 11 wherein said basic organic compound is an alkyl amine having no more than 6 carbon atoms per alkyl group.

14. The electrochemical cell according to claim 11 wherein said basic organic compound is tributylamine.

15. The electrochemical cell according to claim 11 wherein said basic compound is a liquid.

16. A method for preventing decomposition of one or more electrochemical cell components; said components comprising first and second electrodes and an electrolyte; at least one of said electrodes having an active material selected from the group consisting of graphite, and lithium manganese oxide represented by the nominal general formula $LiMn_2O_4$; said method comprising: providing an electrolyte which comprises a salt of lithium in a solvent, and solubilizing said salt in said solvent whereby said electrolyte undergoes reaction with impurities in said cell causing decomposition of one or more said cell components; including in said cell a basic organic compound which inhibits said reaction and thereby prevents said decomposition.

17. The method according to claim 16 wherein said basic organic compound is selected from the group consisting of organic amines.

18. The method according to claim 17 wherein said basic organic compound is tributylamine.

19. The method according to claim 16 wherein said including step is conducted by dispersing said basic compound in said electrode.

20. The method according to claim 19 wherein said basic compound is in liquid form.

21. The method according to claim 16 wherein said solvent is selected to provide transport throughout said cell, said basic compound is liquid or soluble in said solvent, and wherein said including step is conducted by mixing said basic compound in said solvent and transporting said basic compound to said electrode.

22. An electrochemical cell which is stabilized against decomposition; said cell comprising an electrode active material selected from the group consisting of graphite, and lithium manganese oxide represented by the nominal general formula $LiMn_2O_4$; and an electrolyte comprising a salt of lithium, and a solvent which solubilizes said salt, said electrolyte characterized by being reactive with impurities to decompose one or more of said active material and said electrolyte; and a basic organic compound which inhibits said decomposition.

23. The electrochemical cell according to claim 22 wherein said basic organic compound is selected from the group consisting of organic amines.

24. The electrochemical cell according to claim 22 wherein said basic organic compound is tributylamine.

25. The electrochemical cell according to claim 22 wherein said basic compound is a liquid, and said solvent is arranged to provide transport of said basic compound in said cell.

26. An electrochemical cell which is stabilized against decomposition and which comprises:

a. an electrolyte characterized by reactivity with cell impurities;

b. a cathode comprising a lithium-containing active material represented by the nominal general formula $LiMn_2O_4$, which is subject to decomposition caused by said reactivity; and c. a basic organic compound characterized by being reactive to inhibit said decomposition, and which is present in an amount by weight less than said active material.

27. The electrochemical cell according to claim 26 wherein said basic organic compound is selected from the group consisting of organic amines.

28. The electrochemical cell according to claim 26 wherein said basic organic compound is tributylamine.

29. The electrochemical cell according to claim 26 wherein said basic compound is a liquid.

* * * * *